(12) United States Patent
Moody

(10) Patent No.: US 6,655,503 B1
(45) Date of Patent: Dec. 2, 2003

(54) ANTI-ROLLBACK BRAKE

(76) Inventor: Thomas O. Moody, 3301 W. 151st Ct., Broomfield, CO (US) 80020

( * ) Notice: Subject to any disclaimer, the term of this patent is extended or adjusted under 35 U.S.C. 154(b) by 0 days.

(21) Appl. No.: 10/150,173

(22) Filed: May 17, 2002

(51) Int. Cl.[7] ............................................... B60T 1/04
(52) U.S. Cl. ................................ 188/2 F; 280/250.1
(58) Field of Search ........................... 280/242.1, 250.1, 280/304.1; 188/2 F

(56) References Cited

U.S. PATENT DOCUMENTS

| | | | | |
|---|---|---|---|---|
| 3,556,260 A | * | 1/1971 | Meyer et al. | 188/74 |
| 4,462,605 A | * | 7/1984 | Morgan et al. | 280/250.1 |
| 4,560,033 A | * | 12/1985 | DeWoody et al. | 188/2 F |
| 4,987,978 A | * | 1/1991 | Jungersen | 188/2 F |
| 5,029,674 A | * | 7/1991 | Boyes et al. | 188/2 F |
| 5,492,355 A | | 2/1996 | Berry | |
| 5,667,236 A | | 9/1997 | Murphy | |
| 5,984,334 A | | 11/1999 | Dugas | |
| 6,007,082 A | | 12/1999 | Watwood et al. | |
| 6,092,824 A | | 7/2000 | Ritchie et al. | |
| 6,102,166 A | | 8/2000 | Blodee | |
| 6,253,880 B1 | * | 7/2001 | Faber | 188/2 F |
| 6,279,936 B1 | | 8/2001 | Ritchie et al. | |
| 6,308,804 B1 | | 10/2001 | Roberts | |
| 6,464,044 B2 | * | 10/2002 | Suganuma | 188/2 F |
| 2001/0040354 A1 | | 11/2001 | Ritchie et al. | |

* cited by examiner

Primary Examiner—Kevin Hurley
Assistant Examiner—L. Lum
(74) Attorney, Agent, or Firm—Rick Martin; Patent Law Offices of Rick Martin, PC

(57) ABSTRACT

A safety brake for use on a wheelchair, specifically for the purpose of preventing the wheelchair from rolling rearward when the occupant attempts to exit or enter the wheelchair. The safety brake allows forward movement but prevents rearward movement unless the occupant pulls back on the spring loaded brake handles. Upon release of the brake handles the rearward movement is prevented. The assembly replaces existing brake assemblies on wheelchairs and is designed specifically for the cognitively impaired and invalids to enable safe disembarkation from the wheelchair.

10 Claims, 8 Drawing Sheets

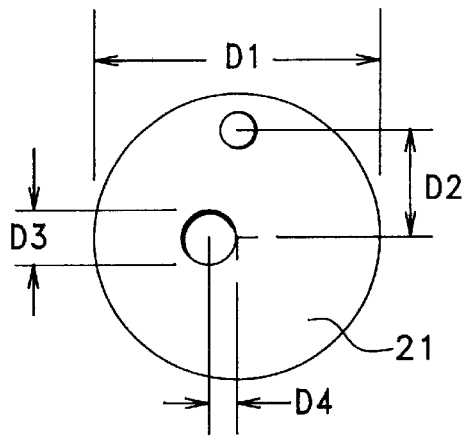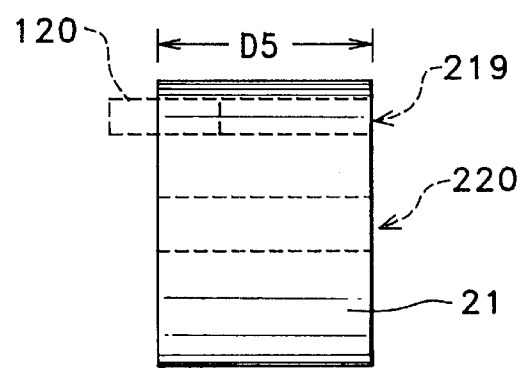
FIG. 4          FIG. 5
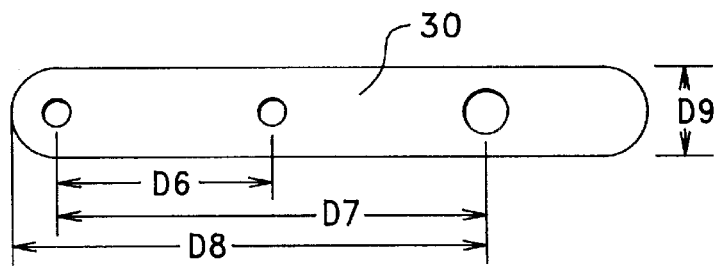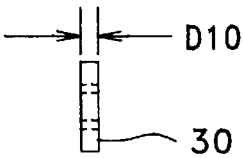
FIG. 6          FIG. 7
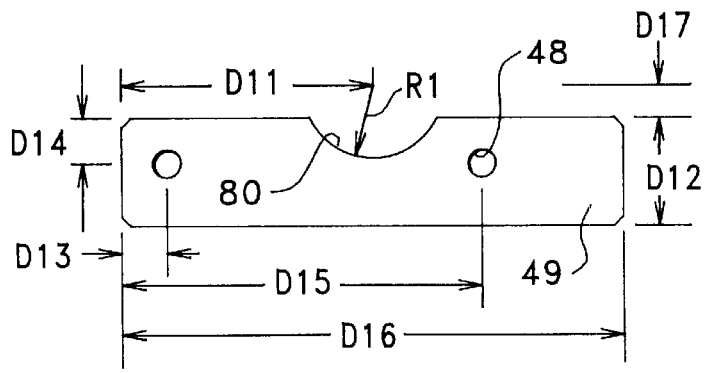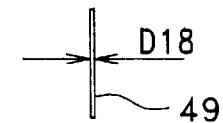
FIG. 8          FIG. 9

ANTI-ROLLBACK BRAKE

FIELD OF INVENTION

The present invention relates to a cam type rearward motion brake for wheelchairs to enable the cognitively impaired to disembark safely from a wheelchair.

BACKGROUND OF THE INVENTION

U.S. Pat. No. 4,987,978 (1991) to Jungersen discloses a safety brake for active cognitive wheelchair users. It allows settings for forward only or backward only braking motion. The system is designed for ramp travel. An egg shaped cam has two cam segments engagable with the tire. A spring-loaded cam follower urges the cam against the tire. A manual lever on the cam can be set to a neutral position which will only provide manual braking via the brake lever. Alternatively the cam lever can be set to an automatic forward brake or an automatic rearward brake position where the brake lever is in the "brake" position, but only a forward or a backward rotation of the tire will cause the cam segment to brake the wheel. This allows a cognitive user using his arms to go up a ramp and rest without rolling backwards. The present invention does not require a cognitive action by the user. The system is not designed for ramp travel, but instead for disembarkation by a non-cognitive user. The present invention does not provide for traditional braking at any time by using the brake lever because the user can only shuffle about with his own feet without using his arms for propulsion. When the brake lever is left alone the tire can move forward, but a cam prevents backward motion. This system makes disembarking from the wheelchair a no brainer function since nobody has to set any brake lever. The tires cannot rotate backward unless pressure is exerted on the brake lever. Another feature of the present invention is a tire lock mode which can be manually set to prevent any motion at all. The present invention is generally referred to as an automatic anti-rollback assembly.

Other anti-rollback assemblies include U.S. Pat. No. 5,984,334 (1999) to Dugas. The seat is spring-loaded as the user lifts his weight off the seat, a spring raises the seat, thereby pulling upward on an axle assembly which locks the brakes against the tires.

U.S. Pat. Nos. 6,092,824, 6,279,936B1 and U.S. publication US2001/0040354A1 to Ritchie et al. discloses a seat activated one-way brake assembly which uses a crossbar member to lock against the tires when the user's weight is not present on the seat.

SUMMARY OF THE INVENTION

The main aspect of the present invention is to provide a hands free non-weight activated cam assembly for a rearward brake for a wheelchair or other invalid transporter having wheels.

Another aspect of the present invention is to provide a universal mounting bracket(s) for most wheelchair frames.

Another aspect of the present invention is to provide a spring-loaded brake lever which automatically engages the tire without any cognitive action by a user.

Another aspect of the present invention is to provide a locking arm which can be manually set to lock the tire.

Another aspect of the present invention is a safety brake assembly for a wheelchair which prevents rearward movement of the wheelchair unless the brake handles of the brake assemblies are held back by the occupant. Other aspects of this invention will appear from the following description and appended claims, reference being made to the accompanying drawings forming a part of this specification wherein like reference characters designate corresponding parts in the several views.

Upon release of the brake handles the wheelchair is prevented from rearward movement. The device comprises a frame attached to the wheelchair, a pivoting brake lever attached to the frame which includes a round wheel with an off-center axle which is placed in front of the wheelchair tire, a limit pin mounted on the inside of the round wheel which comes in contact with the pivoting brake lever preventing the round wheel from rotating backward beyond a set point and preventing the round wheel from rotating forwards beyond a set point, a pivoting brake handle mounted on the frame and attached to a second pivoting member with an internal flange which prevents the brake handle from moving forward beyond a set point. The second pivoting member is also attached to the brake lever between the frame pivot and the round wheel in such a manner as to disengage the round wheel from the wheelchair tire when the brake handle is pulled backwards. A spring is attached between the brake lever and brake handle which causes the brake lever to move back and the brake handle to move forward until the brake handle reaches the internal flange on the second pivoting member and the round wheel comes in contact with the wheelchair tire. When a rearward force is applied to the wheelchair with the brake handles in the forward position against the internal flange of the second pivot member, the round wheel which is in contact with the wheelchair tire rotates backwards until the limit pin comes in contact with the pivoting brake lever. Since the round wheel has an off center axle, as the round wheel rotates backwards pressure is increased against the wheelchair tire until it stops rotating rearward which causes the wheelchair to stop rolling rearward.

The device replaces the existing brake mechanisms (left side and right side) on a wheelchair. The device may include a locking lever attached to the brake lever which can be placed over the limit pin which holds the round wheel in its rearward position, thus applying the greatest pressure on the wheelchair tire and preventing the wheelchair from moving forward and rearward.

BRIEF DESCRIPTION OF THE DRAWINGS

FIG. 4 is a side plan view of the roller of the preferred embodiment.

FIG. 5 is a front plan view of the roller.

FIG. 6 is a side plan view of the roller support arm.

FIG. 7 is an end view of the roller support arm.

FIG. 8 is a side plan view of the locking arm.

FIG. 9 is an end view of the locking arm.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
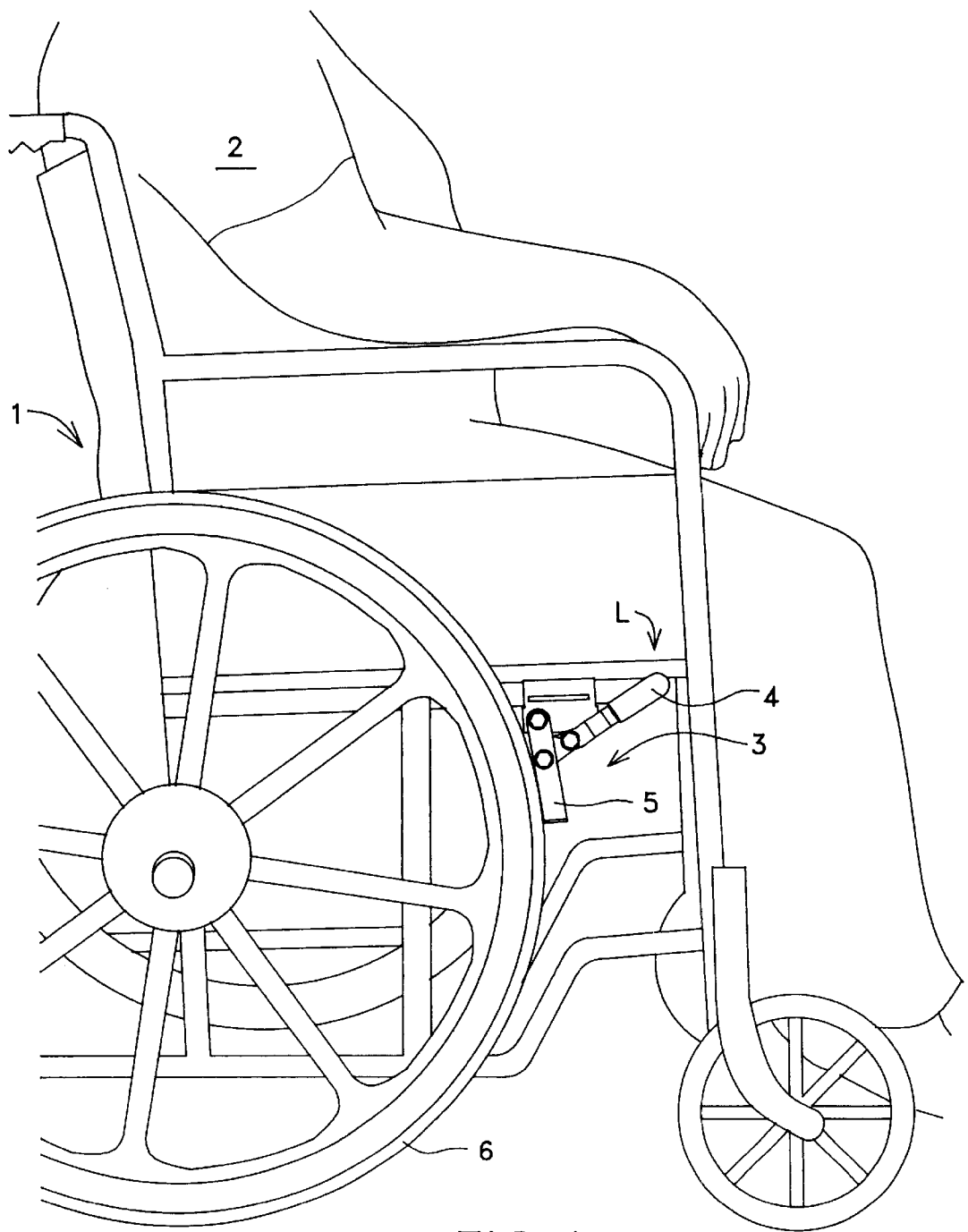
FIG. 1 (prior art) is a side plan view of a wheelchair brake designed for active users to operate while going up a ramp.
Figure 2:
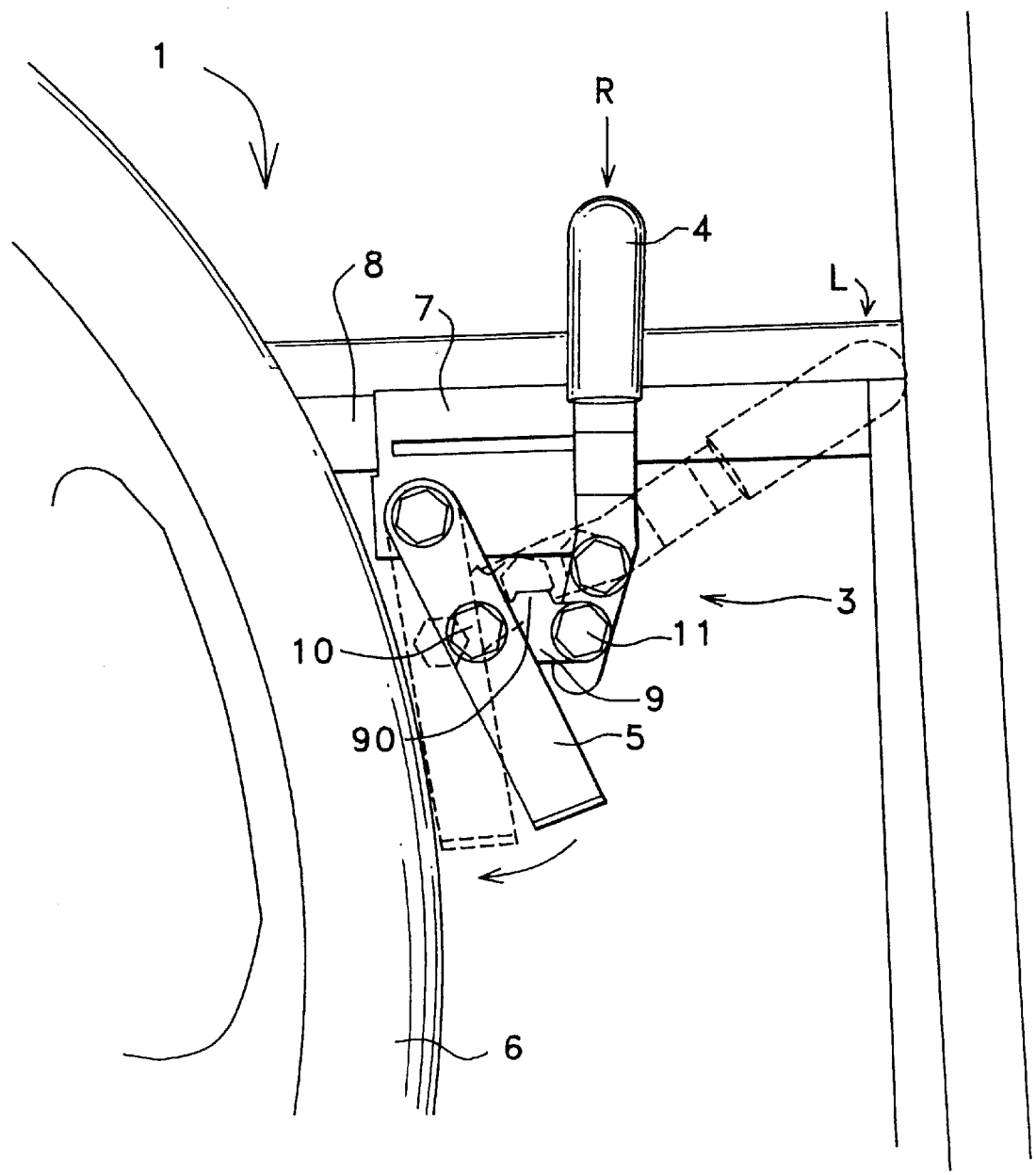
FIG. 2 (prior art) is a side plan view of a close up of a known brake.

Referring first to FIGS. 1,2 a wheelchair 1 is being used by a cognitive user 2 who can operate the brake assembly 3 by moving the control handle 4 into the locked position L. In this position, the brake arm 5 is pressed against the tire 6, thus locking the tire 6. FIG. 2 shows the release position R for the control handle 4. The brake arm 5 is moved away from the tire 6 via link 9. Link 9 has pivot attachments 10, 11 to the brake arm 5 and control handle 4 respectively. A stop 90 prevents an overthrow of the control handle 4 beyond locked position L.

The wheelchair frame 8 is shown as a flat beam to which the brace 7 bolts. Other frame member shapes include tubular, for which other braces (not shown) are made. The present invention utilizes known braces to accommodate the various frame member shapes.

Figure 3:
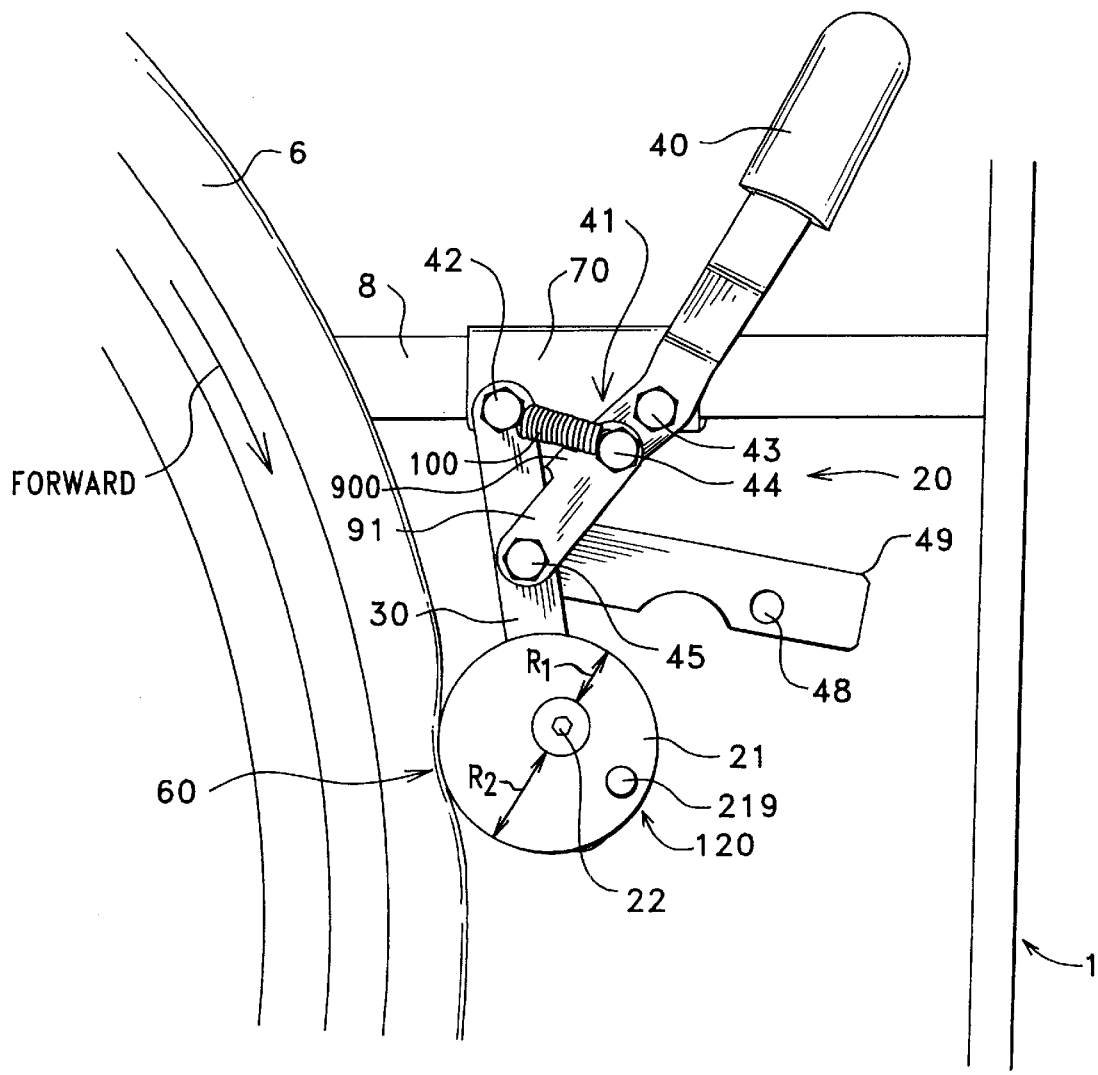
FIG. 3 is the same side plan view of FIG. 2 showing the preferred embodiment replacing the prior art brake.

Referring next to FIG. 3, the user's right wheel brake 20 of the anti-rollback brake system is shown. The preferred embodiment consists of a right wheel and a left wheel brake. The left wheel brake is a mirror image of the right wheel brake and is not shown. The wheel 6 can roll clockwise in direction shown by arrow FORWARD. The brake wheel 21 lightly skids against the wheelchair wheel 6 at contact point 60. If the wheel 6 is rotated counterclockwise in a backwards direction by a user trying to stand up, then the off center axle 22 of the brake wheel 21 will cause the large radius r2 to lock the wheel 6 at point 60. FIG. 3 shows the wheel 6 almost totally locked. When the wheel 6 is rolling forward, the only pressure exerted by the round brake wheel 21 to the wheel 6 is a fraction of the small weight of the brake wheel 21. Brake wheel 21 is preferably made out of hard ABS plastic. No cognitive action by the user is needed to engage the brake wheel 21 into the lock position. When the wheel 6 is turned backwards, the larger radius r2 of the brake wheel 21 is urged into the wheel 6 by the friction force of wheel 6 against brake wheel 21. The brake arm 30 is locked in position by the stop 900 of linkage 91 hitting the handle lever 40 at point 41. Bolts 42, 43, 44, and 45 are pivot points. A limit pin 120 limits the movement of brake wheel 21 by hitting against brake arm 30. See FIGS. 12,13 for a better view. The brake set arm 49 has a hole 48 to engage the limit pin 120, thereby locking the wheel 6 by holding the brake wheel 21 engaged against the wheel 6 with the larger radius r2 at point 60.

Referring next to FIGS. 4, 5, 6, 7, 8 and 9, approximate dimensions and definitions are shown for the components of right wheel brake 20 as follows:

| | | |
|---|---|---|
| Brake wheel axle hole | 220 | .376" Dia. |
| Limit pin hole | 219 | .2490" Dia. |
| D1 | = | 2.00" |
| D2 | = | .750" |
| D3 | = | .376" Dia. |
| D4 | = | .200" |
| D5 | = | 1.50" |
| D6 | = | 1.50" |
| D7 | = | 3.00" |
| D8 | = | 4.00" |
| D9 | = | .625" |
| D10 | = | .125" |
| D11 | = | 1.812" |
| D12 | = | .625" |
| D13 | = | .312" |
| D14 | = | .312" |
| D15 | = | 2.508" |
| D16 | = | 3.50" |
| D17 | = | .250" |
| D18 | = | .030" |
| R1 | = | 1.812" center of radius of cutout 80 |

Figure 10:
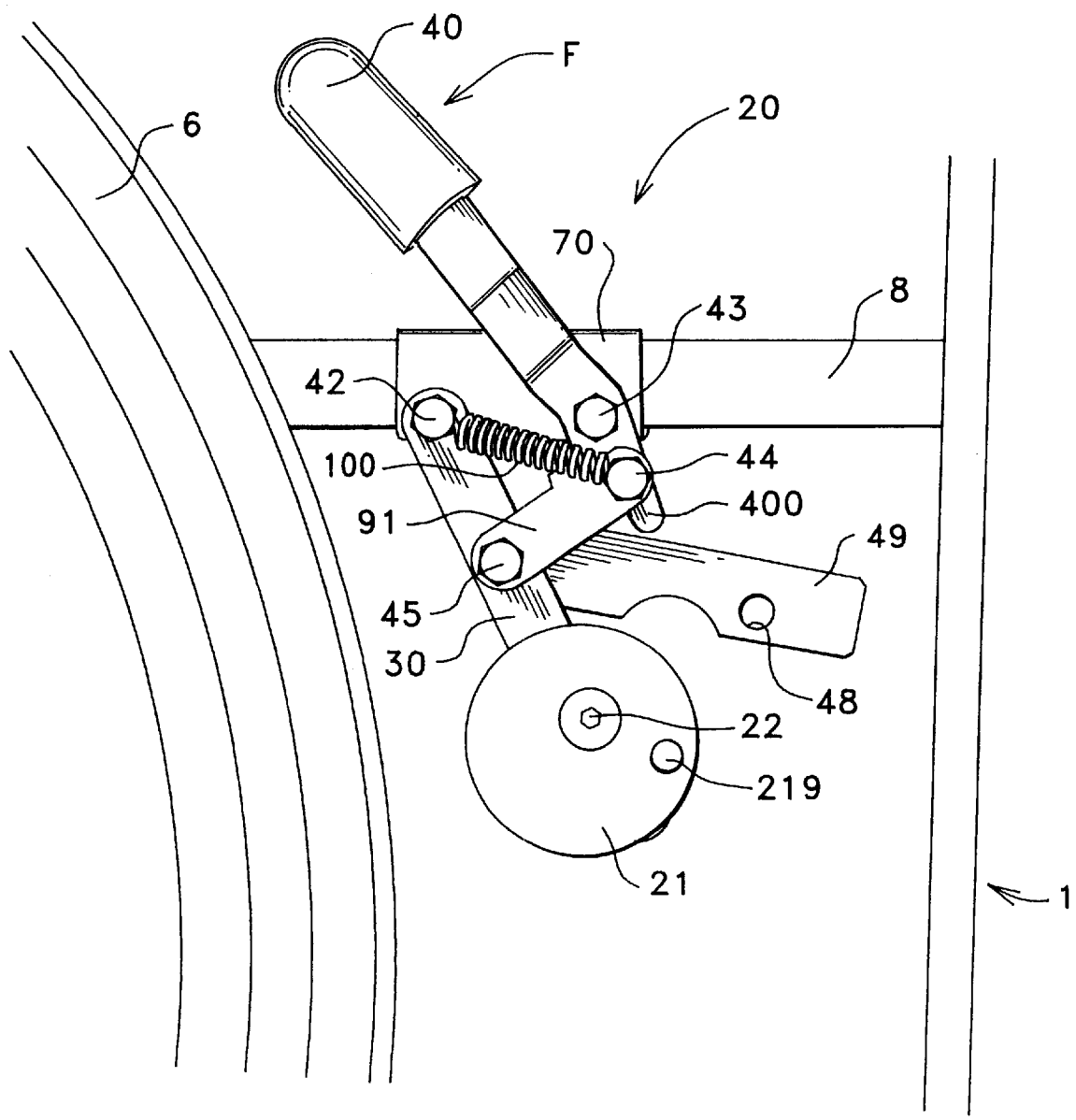
FIG. 10 is the same side plan view of FIG. 3 showing the control handle forced to the release position.

Referring next to FIG. 10, the handle lever 40 has been manually moved in direction F. The brake wheel 21 has been pulled away from wheel 6 by the brake arm 30 via the linkage 91 via the distal end 400 of handle lever 40. The handle lever 40 pivots around pivot point 43. This action allows the wheel 6 to rotate backwards. The spring 100 pulls the distal end 400 back to the operational position shown in FIG. 3 when the handle lever 40 is released.

Figure 11:
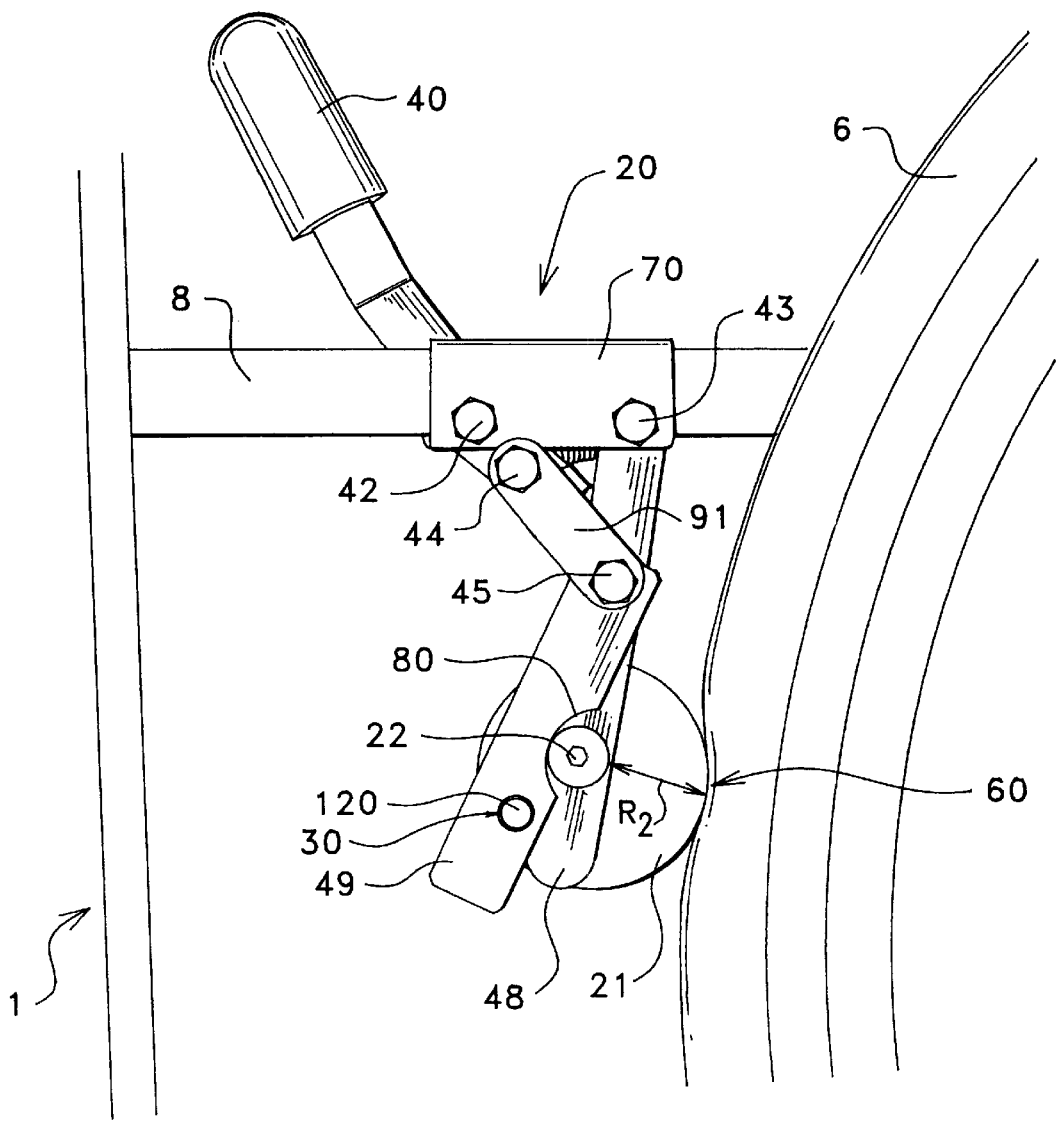
FIG. 11 is an inside to outside side plan view of the same preferred embodiment as shown in FIG. 3, with the locking arm engaged.

Referring next to FIG. 11, the right wheel brake 20 is shown from a perspective looking out from under the wheelchair 1. The brake set arm 49 has been set to engage the hole 48 with the limit pin 120. Cutout 80 rests against axle 22. The wheel 6 is now locked by the force of the brake wheel larger radius r2 being pressed against point 60 and slightly depressing the wheel 6 as shown.

Figure 12:
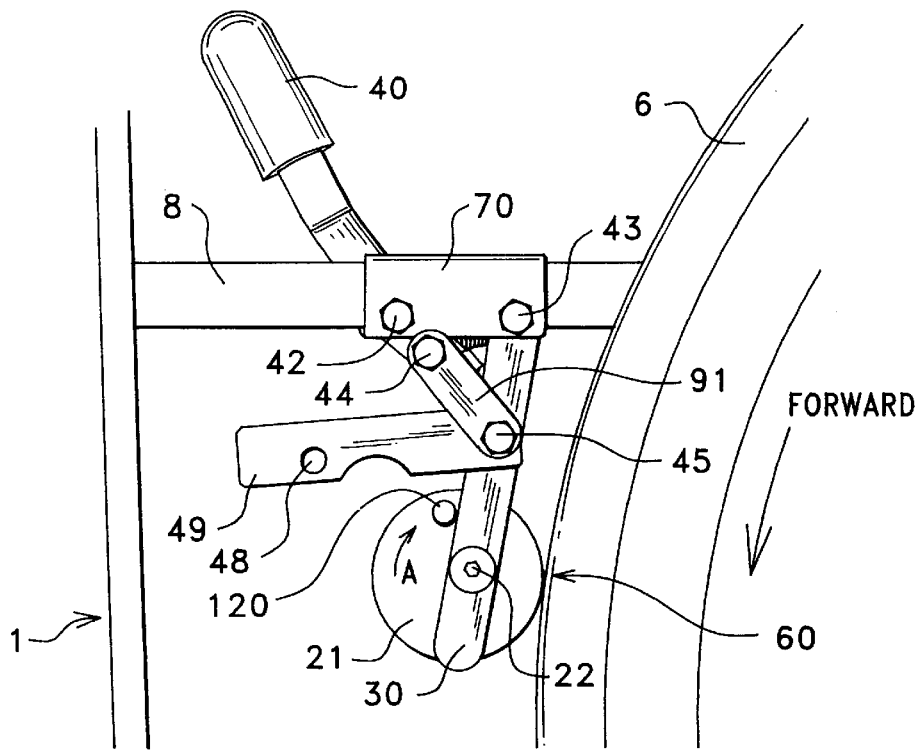
FIG. 12 is the same side plan view as FIG. 11 showing the locking arm disengaged and the wheelchair rolling forward.

Referring next to FIG. 12, the wheel 6 is shown rotating in the forward direction. The limit pin 120 hits the brake arm 30 as the brake wheel 21 is turned in direction A by the moving wheel 6.

Figure 13:
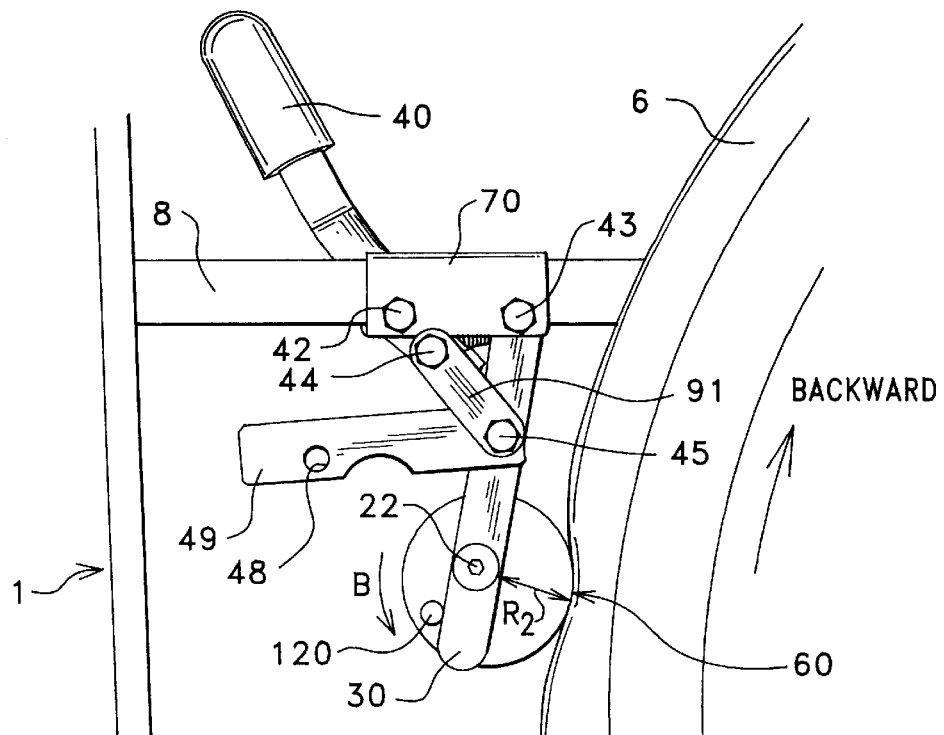
FIG. 13 is the same side plan view as FIG. 12 showing the locking arm disengaged and the wheelchair being braked as the tire is rotated backward.

Referring next to FIG. 13, the wheel 6 is urged backward, thereby rotating brake wheel 21 in direction B. The limit pin 120 has hit the brake arm 30 and the larger radius r2 of the brake wheel 21 has locked the wheel 6 at point 60.

Figure 14:
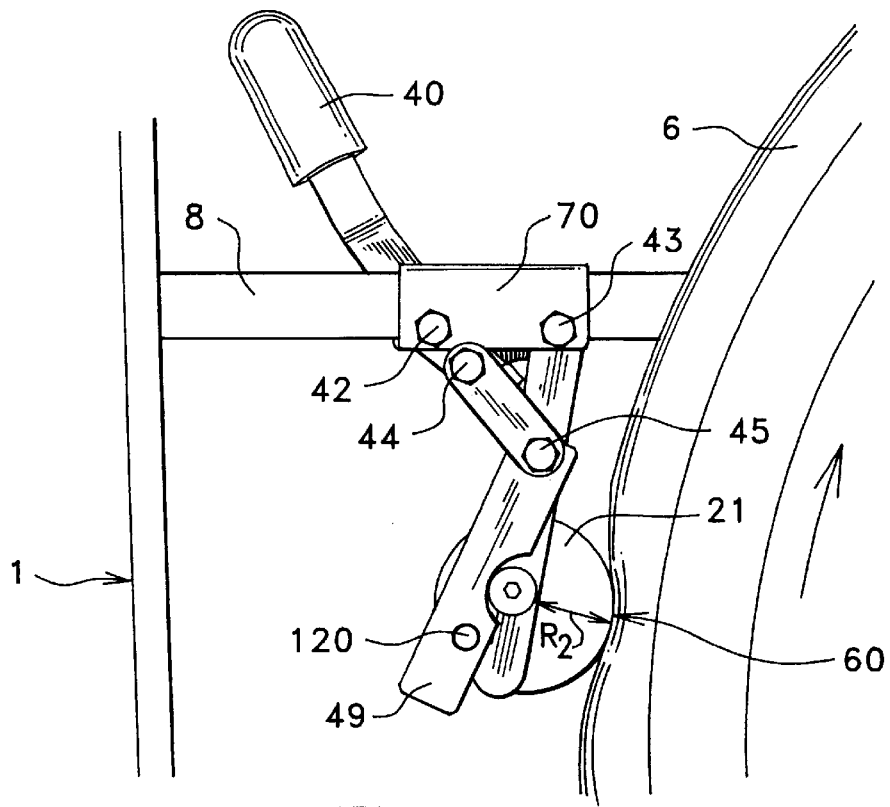
FIG. 14 is the same side plan view as FIG. 13 showing the locking arm engaged.

In FIG. 14, the brake set arm has been engaged at the locked position of wheel 6 shown in FIG. 13. The limit pin 120 will only engage the hole 48 of brake set arm 49 in this locked position of wheel 6.

Figure 15:
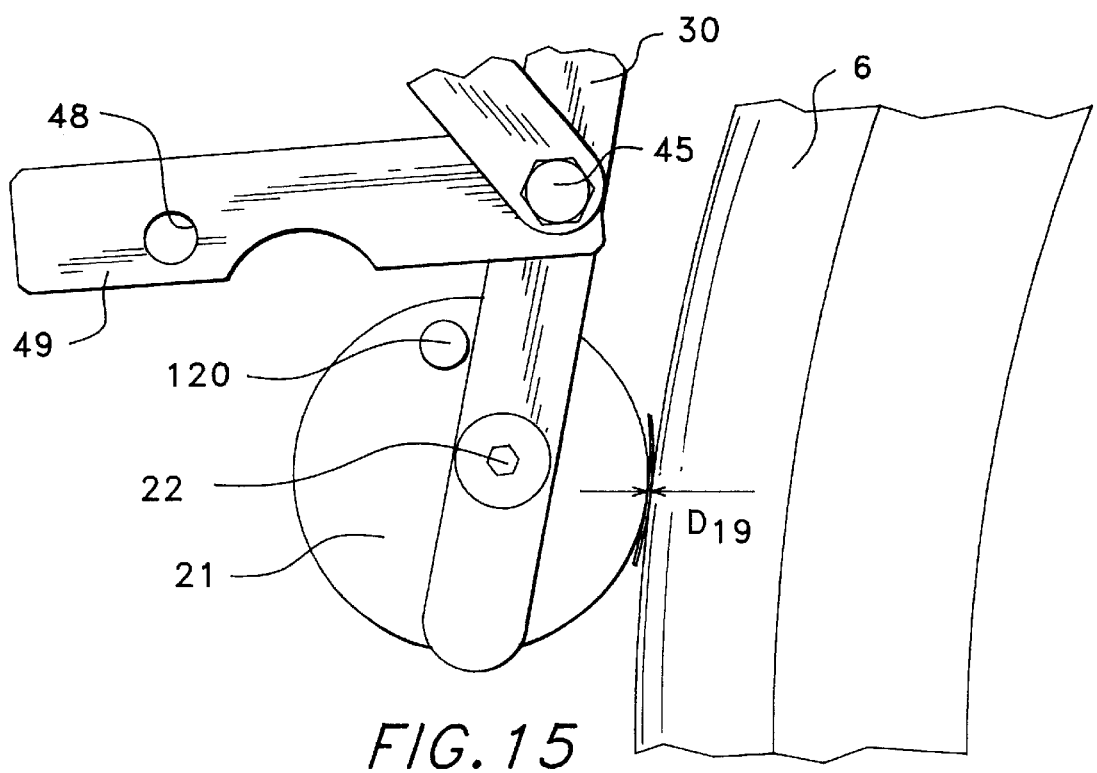
FIG. 15 is the same side plan view as FIG. 12 showing the installation tolerance between the roller and the tire.

Referring next to FIG. 14, the brace 70 must be set at installation time on frame 8 so as to allow only a few thousands of an inch D19 between the brake wheel 21 and the wheel 6 as shown in FIG. 15. Bolts 42, 43 as best seen in FIG. 12 are tightened to fix distance D19.

Although the present invention has been described with reference to preferred embodiments, numerous modifications and variations can be made and still the result will come within the scope of the invention. No limitation with respect to the specific embodiments disclosed herein is intended or should be inferred.

I claim:
1. In combination with a wheelchair brake assembly having a wheelchair frame mounting bracket, a brake handle pivotally mounted to the mounting bracket, at least one link pivotally mounted to a distal end of the brake handle, and a brake lever arm pivotally connected to the mounting bracket and the link, thereby providing a movement of the brake lever arm toward a wheelchair tire when the brake handle is moved forward, wherein a stop on the link abuts the brake handle to stop a motion of the brake lever arm at a point closest to a wheelchair tire, said stop also preventing the motion of the brake lever arm away from the wheelchair tire at a preset distance when the brake handle is moved rearward, the improvement comprising:

said brake lever arm having an elongate shape and having an axle mount at a distal end;

an axle mounted on said axle mount;

a round brake wheel having an off center axle hole mounted to the axle; and a return spring mounted to the link and to the brake lever arm, thereby causing an automatic return of the link and the brake handle to the forward and engaged position so that the wheelchair tire can roll forward freely; wherein the wheelchair tire is braked from rolling backwards due to the round brake wheel and the off center axle hole which causes a larger radius of the round brake wheel to engage the wheelchair tire.

2. The improvement of claim 1, wherein the axle mount further comprises a bolt mounted through a hole in the brake lever arm.

3. The improvement of claim 1, wherein the brake wheel is made from a hard plastic.

4. The improvement of claim 1, wherein the brake wheel further comprises a limit pin near a peripheral edge, thereby limiting a rotation of the brake wheel.

5. The improvement of claim 4 further comprising a brake set lever pivotally mounted to the brake lever arm, said brake set lever having a hole at a distal end to engage the limit pin, thereby locking the wheelchair tire in place.

6. An anti-rollback brake for a wheelchair, said brake comprising:

a mount for a wheelchair frame member;

a brake lever handle pivotally mounted to the mount;

a brake arm pivotally mounted to the mount;

a linkage pivotally mounted between the brake arm and a distal end of the brake lever handle, thereby providing a movement of the brake arm toward and away from a wheelchair tire;

said brake arm having a distal end with an axle;

a brake wheel having an off-center hole mounted on the axle;

wherein a backward rotation of the wheelchair tire rotates the brake wheel to force a larger radius of the brake wheel against the wheelchair tire, thereby locking the wheelchair tire; and wherein a forward rotation of the wheelchair tire rotates the brake wheel to force a smaller radius of the brake wheel against the wheelchair tire, thereby allowing the wheelchair tire to slide against the brake wheel while the wheelchair tire is rotating forward.

7. The brake of claim 6, wherein the brake wheel is round.

8. The brake of claim 7, wherein the brake wheel further comprises a limit pin to engage the brake arm.

9. The brake of claim 8 further comprising a return spring mounted between the mount and a pivot connection between the linkage and the brake lever handle.

10. The brake of claim 8 further comprising a brake set arm mounted to the brake arm to engage the limit pin in a locked position of the brake wheel against the wheelchair tire.

* * * * *